(12) United States Patent
Hirsch

(10) Patent No.: US 6,351,213 B1
(45) Date of Patent: Feb. 26, 2002

(54) METHOD AND COMMUNICATION SYSTEM FOR PROCESSING ALARMS USING A MANAGEMENT NETWORK INVOLVING SEVERAL LAYERS OF MANAGEMENT

(75) Inventor: Lucian Hirsch, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,559
(22) PCT Filed: Dec. 28, 1998
(86) PCT No.: PCT/DE98/03807
  § 371 Date: Jul. 19, 2000
  § 102(e) Date: Jul. 19, 2000
(87) PCT Pub. No.: WO99/37101
  PCT Pub. Date: Jul. 22, 1999

(30) Foreign Application Priority Data

Jan. 19, 1998 (DE) .......................................... 198 01 784

(51) Int. Cl.⁷ .............................................. G08B 29/00
(52) U.S. Cl. ...................................................... 340/506
(58) Field of Search ................................. 340/505, 506, 340/517, 531, 538, 825.24, 825.25, 286.01, 286.07

(56) References Cited

U.S. PATENT DOCUMENTS 5,204,955 A    4/1993  Kagei et al. .................. 714/55
5,619,183 A *  4/1997  Ziegra et al. ................ 340/505

FOREIGN PATENT DOCUMENTS

| DE | 197 52 614 A1 | 6/1999 |
| WO | WO 96/20547 | 7/1996 |
| WO | WO 96/24899 | 8/1996 |
| WO | WO 97/24835 | 4/1997 |
| WO | WO 97/24837 | 7/1997 |

* cited by examiner

Primary Examiner—Daryl Pope
(74) Attorney, Agent, or Firm—Bell, Boyd & Lloyd LLC (57) ABSTRACT

The invention is based on the alarm data for active alarms being transmitted for alarm realignment between an agent (AG) on one management level (B, C) and at least one manager (MA1, MA2) on a next highest management level (A, B). Furthermore, the manager (MA1, MA2) sends one or more request notifications (repAA) to the agent (AG) for transmission of the alarm data, and receives correlation information (alaAH, aliNI) for assigning the respective request to the notifications (alNO) subsequently sent by the agent (AG). According to the invention, the manager (MA1, MA2) controls the alarm realignment on the basis of at least one parameter sent to the agent. The subject of the invention makes alarm realignment parameterizable for the manager, as regards the basic set of functions—use of the correlation information—, i.e. it is no longer necessary for all active alarms to be imperatively sent by the agent, but only those defined in more detail by the transmitted parameters. The result of this is optimum use of the transmission resources on the interface of the agent/manager relationship and the fastest possible provision by the agent of only that alarm data which is desired by the manager.

19 Claims, 6 Drawing Sheets

M-ACTION Request: repAA (alaAH, relEN, relPS, priSV, relTI, priDT)

M-EVENT-Report: staAA (alaAH, aliNI)

M-EVENT-Report: alNO (aliNI)

M-EVENT-Report: alNO (aliNI)

⋮

M-EVENT-Report: alNO (aliNI)

M-ACTION-Response: repAA (alaAH)

FIG 4

| MA1/MA2 | AG |
|---|---|
| NMC1/NMC2 | OMC1 |
| OF1/OF2 | BSS11 |

M-ACTION Request: repAA (alaAH, priSV=TRUE,
relTI (inst="12.01.1998 10:15:00",
    inen="12.01.1998 11:15:00")
→

M-EVENT-Report: staAA (alaAH, aliNI)
←

M-EVENT-Report: alNO (aliNI, .., SV=cri evT=10:50:30)
←

M-EVENT-Report: alNO (aliNI, .., SV=cri eventTime=10:20:20)
←

M-EVENT-Report: alNO (aliNI, .., SV=maj evT =10:25:50)
←

M-EVENT-Report: alNO (aliNI, .., SV=min evT =10:22:10)
←

M-EVENT-Report: alNO (aliNI, .., SV=war evT =10:17:30)
←

M-ACTION-Response: repAA (alaAH)
←

M-SET:
priSV=TRUE,
relTI (inst="12.01.1998 10:15:00",
         inen="12.01.1998 11:15:00")

M-ACTION Request: repAA (alaAH)

M-EVENT-Report: staAA (alaAH, aliNI)

M-EVENT-Report: alNO (aliNI, .., SV=cri evT=10:50:30)

M-EVENT-Report: alNO (aliNI, .., SV=cri eventTime=10:20:20)

M-EVENT-Report: alNO (aliNI, .., SV=maj evT =10:25:50)

M-EVENT-Report: alNO (aliNI, .., SV=min evT =10:22:10)

M-EVENT-Report: alNO (aliNI, .., SV=war evT =10:17:30)

M-ACTION-Response: repAA (alaAH)

FIG 7

| MA1/MA2 | AG |
|---|---|
|  |  |

M-GET Request : priSV, relTI

M-GET Response :
priSV=true,
relTI (inst="12.01.1998 10:15:00",
    inen="12.01.1998 11:15:00")

FIG 8

METHOD AND COMMUNICATION SYSTEM FOR PROCESSING ALARMS USING A MANAGEMENT NETWORK INVOLVING SEVERAL LAYERS OF MANAGEMENT

The invention relates to a method and to a corresponding communication system for handling alarms using a management network which has a plurality of management levels, the alarm data for active alarms being transmitted for alarm realignment between an agent on one management level and at least one manager on a next highest management level.

The principles of a management network, which are also called TMN (Telecommunications Management Network) principles, define a plurality of management levels for managing a communication system—for example a mobile communication system—, each level having a dual function. In the managing system, every level except for the bottom one has a manager function for the level situated below it. In the managed system, every level except for the top one has an agent function for the next highest level.

Fault management is an important part of TMN management. In principle, the agent plays the active role here by recognizing, in good time and accurately, faults on its own management level and transmitting them as alarms to the manager on the next highest level. The transmission of alarm data from the agent to the manager is not critical as long as the communication mechanism between these systems is not impaired. If the connection between the two management levels, that is to say between the agent and the manager, is no longer ensured for a particular time, the agent must temporarily store the alarms which have occurred during this interval to ensure that, after the possibility of communication has been restored, an overview of the currently active alarms—e.g. in the form of a list—is provided to the manager as quickly as possible, on the one hand, and, on the other hand, the manager can establish as complete an alarm history as possible both for the active and for the cleared alarms.

For this purpose, alarm realignment between the agent and the manager is carried out whenever a new connection is established after a connection has been terminated or after the agent or the manager has been initialized. All the alarm data for active alarms for which faults have not yet been cleared in the agent—which can be recognized from the fact that they are not identified as "cleared alarms"—can therefore be provided to the next highest management level in full and as quickly as possible.

The earlier patent application P 19752614.4 specifies such a method and communication system for handling alarms describing a basic set of functions for the manager to request all the alarms from the agent. In this context, the agent sends the active alarms as a sequence of standardized M-EVENT-REPORTS which is embedded in an M-ACTION request initiated by the manager at the start and in an M-ACTION response initiated by the agent at the end. These are generic CMISE-standardized (Common Management Information Service Element) procedures defined on the basis of ITU-T X.710. ITU-T X.733 defines the content of a standardized alarm transmission (alarm report) implemented on the basis of the M-EVENT-REPORT services. All M-EVENT-REPORTS defined under this M-ACTION are explicitly correlated to the respective request using correlation information. This allows the manager to assign these M-EVENT-REPORTS to a particular request, and, furthermore, to distinguish them from other, "regular" M-EVENT-REPORTS.

The object of the invention is to specify such a method and communication system for handling alarms using a management network which has a plurality of management levels and optimizes alarm realignment between an agent and at least one manager.

The invention achieves this object, in terms of the method, with the features of patent claim 1, and, in terms of the communication system, with the features of patent claim 12. Developments of the invention can be found in the subclaims.

The invention is based on the alarm data for active alarms being transmitted for alarm realignment between an agent on one management level and at least one manager on a next highest management level. Furthermore, the manager sends one or more request notifications to the agent for transmission of the alarm data, and receives correlation information for assigning the respective request to the notifications with the alarm data which are subsequently sent by the agent. According to the invention, the manager controls the alarm realignment on the basis of at least one parameter sent to the agent.

The subject of the invention makes alarm realignment parameterizable for the manager, as regards the basic set of functions, i.e. it is no longer necessary for all active alarms to be imperatively sent by the agent, but only those defined in more detail by the transmitted parameters. This provides the manager with a selection function for a subset from all the alarms. The possibility, in particular, of controlling realignment using simple means and using standardized notifications increases the manager's flexibility and significantly reduces the flow of notifications and information. For the first time, the parameterizable alignment functions according to the invention make it possible, by way of example, to prioritize the alarms and/or to have active control over the sequence of the requested alarms. Particularly the combination of the basic set of functions—use of the correlation information—with the parameterizable alignment functions produces a particularly effective method and communication system, resulting in optimum use of the transmission resources on the interface of the agent/manager relationship and the fastest possible provision by the agent of only that alarm data for active alarms for the next highest management level which is desired by the manager.

According to one development of the invention, the manager sends the parameter or parameters to the agent in each request notification. This means that the manager's desired parameterization of alarm realignment takes place individually for every single request.

According to one alternative development of the invention, the manager sends the parameter or parameters to the agent in a setting notification which has precedence over the request notifications. This means that the manager's desired parameterization of alarm realignment takes place, before the first request notification, jointly for a plurality of requests for which the manager's one-off setting contained in the setting notification is valid.

According to further advantageous developments of the invention, parameterization can take place with one or more of the following parameter values set by the manager in each case. The parameter value requests, from the agent, alarms which originate from selected agent units, for which there is an assumed urgency, which the agent uses during sending to prioritize the requested alarms according to their urgency, preferably using different urgency values, which originate within a time interval defined by a start instant and an end instant, which the agent uses during sending to prioritize the alarms according to the origination instant of the alarms.

In one refinement of the subject of the invention, the agent provides and sends the alarm data for the alarms having the earliest origination instants first, and provides and sends the alarm data for the alarms having the most recent origination instants last.

Thus, in a particularly beneficial refinement of the subject of the invention, the agent provides and sends the alarm data for alarms having critical urgency, for which the set of functions is assumed to be no longer present, first, and provides and sends the alarm data for alarms having non-critical urgency, for which the set of functions is assumed to be still present, last.

Using the above procedure, the manager can deliberately call up those alarms which are particularly critical in terms of functions, and hence are important to said manager, and can thus significantly reduce the load on the interface with the agent, as compared with the conventional method for automatically reporting all alarms, as a result of the flow of information limited only to particular alarms.

The invention is explained in more detail below using illustrative embodiments with reference to the figures, in which.

The illustrative embodiment describes the invention using a TMN concept for the management of a mobile communication system which, by way of example, has network elements in a mobile radio network based on the GSM standard. However, the invention is not restricted to mobile radio networks, but can be applied to any kind of telecommunication networks which use a TMN management network.

A mobile communication system is a hierarchically structured system of different network elements, in which the bottom stage of the hierarchy is formed by the mobile stations. These mobile stations communicate, via a radio interface, with radio stations which form the next level of the hierarchy and are called base stations. The base stations, which supply, by way of example, mobile stations in a radio range of a radio cell, are preferably combined to cover a relatively large radio area and are connected to superordinate network elements, the base station controllers. The base stations and base station controllers are part of a base station subsystem of the mobile communication system. The base station controllers communicate, via defined interfaces, with one or more switching centers, the mobile exchanges, which are also used, among other things, for crossing to other communication networks. The mobile exchanges form, together with a plurality of databases, the switching subsystem of the mobile communication system.

In addition to the above network elements, there are one or more operation and maintenance centers, which, among other things, are used to configure and monitor the network elements. In this regard, monitoring measures and configuration measures are usually controlled remotely from operation and maintenance centers, which are normally arranged in the region of the mobile exchanges. An operation and maintenance center in this case communicates with a respective base station subsystem or switching subsystem via a defined interface. A further task of the operation and maintenance system is carrying out configuration management, which, in addition to fault management, represents one of five management function areas identified by the TMN principles. Configuration management defines a series of services which enable the user to change the structure and hence the behavior of a telecommunication network. These services always relate to instances of managed objects, which by and large form the network-specific management information base.

A managed object, in the configuration management sense, is a logical abstraction of a resource in the mobile communication system. In this case, a distinction is made between hardware-related managed objects, which describe manufacturer-specific realization of a function, and function-related managed objects, which each involve the abstraction of a set of functions which is independent of the manufacturer.

For managing the mobile communication system, the TMN principles define a plurality of levels, three of these levels being explained below in the present example with reference to FIGS. 1 and 2.

Figure 1:
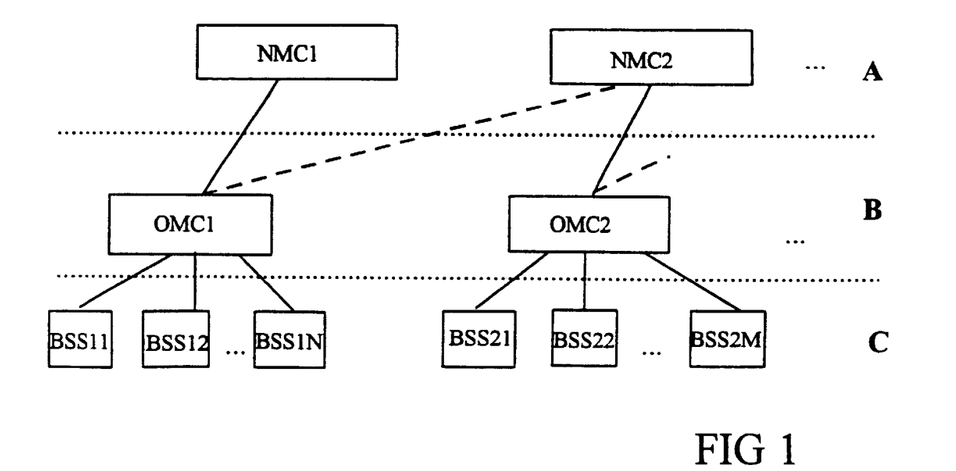
FIG. 1 shows the block diagram of a management network for a mobile communication system with an agent/manager relationship between an operation and maintenance center and one or more network management centers.
Figure 2:
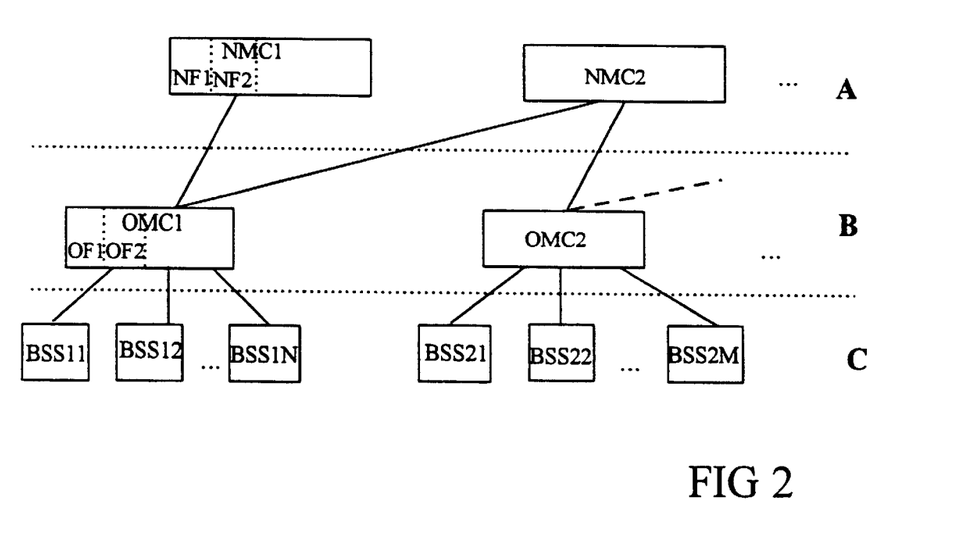
FIG. 2 shows the block diagram of the management network shown in FIG. 1 with an agent/manager relationship between a base station subsystem and an operation and maintenance center for implementing at least two applications for the base station subsystem.

FIGS. 1 and 2 each show three levels A, B and C in the management network, of which management level C contains the network element level having a plurality of base station subsystems BSS11, BSS12 ... BSS1N and BSS21, BSS22 ... BSS2M. Management level B identifies the network element management level in which operation and maintenance centers OMC1 and OMC2 each provide the manufacturer-specific management functions for individual subsystems, such as the operation and maintenance center OMC1 for the base station subsystems BSS11, BSS12 ... BSS1N and the operation and maintenance center OMC2 for the base station subsystems BSS21, BSS22 ... BSS2M in the present example. Management level A identifies the network management level in which network management centers NMC1 and NMC2 perform respective integrated management functions that are independent of the manufacturer. In this case, a plurality of network management centers can have access to the same network element on the next lowest management level B, in the present example the network management centers NMC1 and NMC2 on the next highest management level A can have access to the operation and maintenance center OMC1 on the next lowest management level B. Defined interfaces for transferring information are provided between the network elements on different management levels.

The difference between the illustrations shown in FIGS. 1 and 2 is that an agent/manager relationship for handling alarms exists, for one or more alarm realignments, in FIG. 1, between the operation and maintenance center OMC1 (agent) and a network management center NMC1 (manager) or a plurality of—physically separate—network management centers NMC1, NMC2 (managers), and in FIG. 2, between the base station subsystem BSS11 (agent) and two different applications OF1 and OF2 (managers) in the operation and maintenance center OMC1 or between the operation and maintenance center OMC1 (agent) and two different applications NF1 and NF2 (managers) in the network management center NMC1. To ensure an overview of the fault situation in the network management centers NMC1, NMC2 at all times, the operation and maintenance center OMC1—on the basis of faults occurring within the supervised base station subsystems BSS11 . . . BSS1N, for example—provides stored alarm data for active alarms and sends it to both managers in parallel on request. This preferably occurs after a connection has been terminated or after the agent or the manager has been initialized. Similarly, a plurality of requests can also be addressed to the agent, e.g. the operation and maintenance center OMC1, in succession by an individual manager, e.g. the network management center NMC1. FIG. 1 shows the structure for alarm realignment requests which, in accordance with the invention, are transmitted a plurality of times and, in the present example, take place in parallel between the management level B, which contains the agent in the form of the operation and maintenance center OMC1, and the next highest management level A, in which the managers are formed by at least two network management centers NMC1, NMC2.

To ensure an overview of the fault situation at all times in management level B as well, e.g. in the operation and maintenance center OMC1, the base station subsystem BSS11—on the basis of faults occurring within the supervised base stations and base station controllers, for example—provides the stored alarm data for active alarms and sends it, in parallel, to at least two managers in the operation and maintenance center OMC1 in the form of the different applications OF1 and OF2, which are both implemented by one and the same physical element OMC1. This likewise occurs preferably after a connection has been terminated or after the agent or the manager has been initialized. Requests initiated a plurality of times by an individual manager, e.g. the operation and maintenance center OMC1, can also be transmitted serially to the agent, e.g. the base station subsystem BSS11. As an alternative or in addition, an agent/manager relationship can also exist between the operation and maintenance center OMC1 (an agent) and the network management center NMC1 (a manager) for serial interchange of requests and alarm data or for parallel interchange of requests and alarm data for at least two different applications NF1 and NF2 (two managers) in the network management center NMC1. FIG. 2 shows the structure for alarm realignments, taking place in parallel according to the invention, between management level B, which contains the managers in the form of applications OF1 and OF2, and the next lowest management level C, which contains the agent.

As soon as an internal interface which has failed on management level C is operational again, the alarm realignment, also called realignment procedure or realignment method, is started at the request of the manager/managers, the manager controlling the alarm realignment on the basis of parameters, in accordance with the invention. For this, in the present example, the alarm realignment is first started between the base station subsystem, e.g. BSS11, and the applications OF1, OF2 in the operation and maintenance center OMC1, in parallel, and is then continued between the operation and maintenance center OMC1 and the superordinate network management centers NMC1, NMC2 in parallel. At the end of these procedures, the fault situation both in the OMC and also in the NMC is updated again. The realignment method can, of course, be restricted to updating the alarm data between the agent and the managers on two immediately adjacent management levels, e.g. level B and level A.

Figure 3:
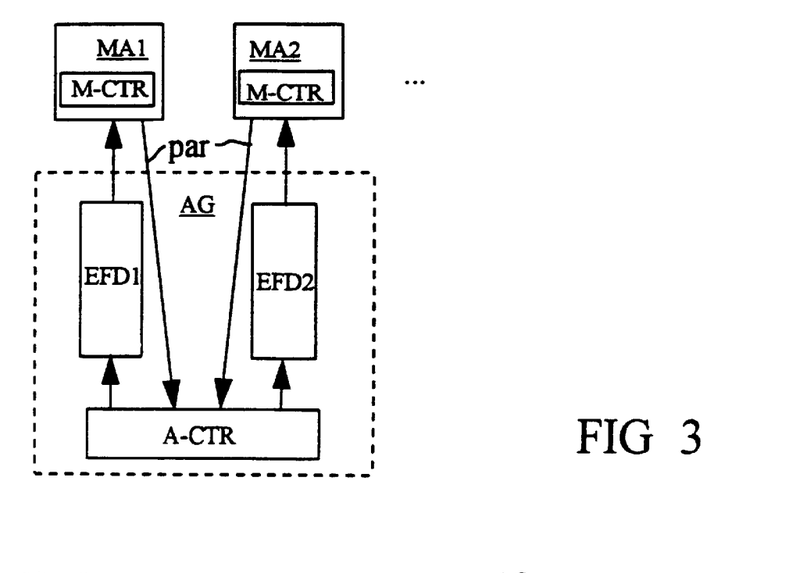
FIG. 3 shows the block diagram of the agent and the manager for handling the alarms for alarm realignments taking place in parallel or serially.

FIG. 3 shows a schematic illustration of the structure of the agent AG and the managers MA1, MA2 with the elements necessary for carrying out realignment procedures performed simultaneously—in the case of two or more managers—or serially—in the case of only one manager. Each manager MA1, MA2 and agent AG has a control element M-CTR and A-CTR, respectively, which can generate and evaluate the notifications for the alarm realignment. They also have transmission/reception elements (not shown in more detail) for transmitting and receiving the notifications, and memory elements for storing the alarm data and other useful information and signaling information.

In this arrangement, the control elements M-CTR in the managers MA1, MA2 insert an item of correlation information, which is used for assigning the request to subsequently sent notifications, into the respective request notification for transmission of the alarm data by the agent, said item of correlation information being explicit and prompting transmission to the agent. Furthermore, the elements M-CTR in the managers MA1, MA2 insert, for controlling the alarm realignment, one or more parameters par into each request notification individually or into a setting notification which has precedence over the request notifications, in order to make a deliberate request for particular alarms identified by various parameter values. The respective request notification or the separate setting notification is sent with the parameters par to the agent AG. For the first time, the parameterizable alignment functions according to the invention make it possible, by way of example, to prioritize the alarms and/or to have active control over the sequence of the requested alarms.

The control element A-CTR in the agent AG receives the corresponding notification with the parameters par, evaluates it and starts realignment in respect of the managers MA1, MA2 by sending back the alarms specifically requested by the managers. In this case, the explicit item of correlation information entered in the request notification by the managers MA1, MA2 is used for correlating the requests, and a respective notification with a further item of correlation information for assigning the notifications (alarm notifications) subsequently sent by the agent for the respectively started realignment is sent to the next highest management level. The further item of correlation information is also explicit. The use of the correlation information allows realignments carried out simultaneously or serially to be explicitly assigned to a plurality of managers or to an individual manager.

Particularly the combination of the basic set of functions—use of the correlation information—with the parameterizable alignment functions produces a particularly effective method and communication system, resulting in optimum use of the transmission resources on the interface of the agent/manager relationship and the fastest possible provision by the agent of only that alarm data for active alarms for the next highest management level which is desired by the manager. Resource utilization, duration and flexibility are consequently optimized further, as compared with the basic set of functions, in the communication system designed in accordance with the invention.

As an option, a plurality of filter functions EFD1, EFD2 (Event Forwarding Discriminators), which can each be assigned to the managers MA1, MA2 and can be controlled by them, with filter criteria for the notifications produced by the agent AG can also be used in the agent AG, so that the notifications with the alarm data are routed to the managers MA1, MA2 only if the filter criteria are satisfied. The manager's control element M-CTR is able to set up and delete such filter functions in the agent AG and to define the filter criteria in order to be able to control the notification flow on the basis of its individual requirements. The case can therefore arise in which the filter function setting differs from manager to manager, so that the simultaneously performed realignment procedures handle alarms with different contents using associated alarm data.

Figure 4:
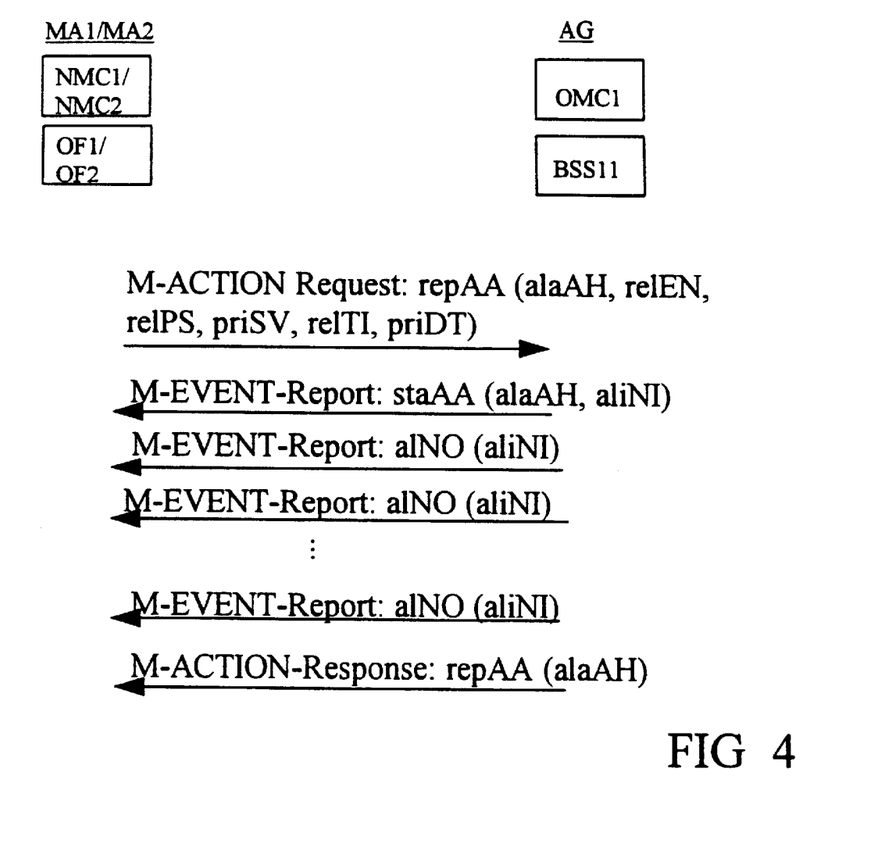
FIG. 4 shows the notification flow between the manager and the agent for the individual parameter-dependent control of alarm realignment in each request notification.

FIG. 4 shows the notification flow between an agent AG—the operation and maintenance center OMC1 in the example shown in FIG. 1 or the base station subsystem BSS11 in the example shown in FIG. 2—and the manager MA1, MA2—the various network management centers NMC1, NMC2 in the example shown in FIG. 1 or the various applications OF1, OF2 in the example shown in FIG. 2.

The notification flow occurs preferably using standardized M-EVENT-REPORT notifications embedded in an M-ACTION request initiated at the start and in an M-ACTION response initiated at the end. These are generic CMISE-standardized (Common Management Information Service Element) procedures defined on the basis of ITU-T X.710. ITU-T X.733 defines the content of a standardized alarm transmission (alarm report) implemented on the basis of the M-EVENT-REPORT services. The correlation information is entered in the notifications or in particular notification fields. Furthermore, the managers MA1, MA2 provide the parameters for controlling the alarm realignment with particular parameter values and enter them in the respective request notification individually or in multiples. The example in FIG. 4 shows the notification flow using individual notifications only, where these can be transmitted in parallel between the agent AG and the managers MA1, MA2 or serially between the agent AG and the individual manager MA1.

As soon as communication is restored between the manager MA1, MA2 and the agent AG after the connection is interrupted, each manager MA1, MA2 sends the M-ACTION request with a request notification repAA (report Active Alarms) for transmission of the alarm data. Preferably, an item of correlation information alaAH (alarm Alignment Handle)—in the defined notification field "actionInformation", for example—defined by the manager MA1, MA2 is sent as well, this item of correlation information identifying direct assignment of the current M-ACTION request to all subsequent agent notifications. Consequently, with a plurality of managers, the current request can also be assigned to the relevant manager, so that the managers' parallel realignments can be initiated, carried out and ended independently of one another.

The request notification repAA also contains the parameter values entered by the manager for the subsequent functional sequence. This is used to request a one-off individual function execution (action) for parameter-dependent transmission of alarms by the agent AG. Parameterization can preferably take place with one or more set parameter values relEN (related Entities), relPS (related perceived Severity), priSV (prio severity), relTI (related Time Interval), priDT (prio Detection Time). The specific parameter value requests, from the agent, alarms which originate from selected agent units (relEN), for which there is an assumed urgency (relPS), which the agent uses during sending to prioritize the requested alarms according to their urgency, preferably using different urgency values (priSV), which originate within a time interval defined by a start instant and an end instant (relTI), which the agent uses during sending to prioritize the alarms according to the origination instant of the alarms (priDT).

The parameter values relEN . . . are contained in a notification field, stipulated according to the standard, of the M-ACTION request, so that fields which already exist and are defined can also be used. A beneficial variant involving time is where the agent provides and sends the alarm data for the alarms having the earliest origination instants first, and provides and sends the alarm data for the alarms having the most recent origination instants last. A particularly suitable variant of the combination of parameter values relating to time and urgency is where the agent provides and sends the alarm data for alarms having critical urgency, for which the set of functions is assumed to be no longer present, first, and provides and sends the alarm data for the alarms having noncritical urgency, for which the set of functions is assumed to be still present, last.

Following evaluation of the parameters in the M-ACTION request received and provision of only that alarm data which is associated with the alarms defined by the manager in the parameterized request, the agent AG starts alarm realignment by producing a notification staAA (start Alarm Alignment) and inserting a further item of correlation information aliNI (alignment Notification Id) into this notification. The item of correlation information aliNI entered by the agent AG allows subsequent alarms to be directly correlated to the respectively started alarm realignment. For this, the item of correlation information alaAH is likewise contained in a particular notification field. The item of correlation information aliNI is, by way of example, entered in the standardized notification field "notification Identifier" in the notification staAA. The two items of information alaAH, aliNI are transmitted together in the notification staAA by the agent AG to the managers MA1, MA2. This allows "alignment-related" M-EVENT-REPORT notifications for different M-ACTION requests to be distinguished from one another, and also from regular M-EVENT-REPORT notifications which have nothing to do with realignment. The reason for this is that an alignment procedure does not necessarily stop other M-EVENT-REPORT notifications which spontaneously arise during the alignment procedure and are sent to the manager(s).

The item of correlation information alaAH sent together with the request notification repAA for the M-ACTION request can be used to correlate the subsequent notifications staAA and repAA directly, because they likewise contain the item of correlation information alaAH. The notifications alNO are directly correlated to the notification staAA by means of the item of correlation information aliNI. The manager can correlate the request notification repAA to the subsequent notifications alNO indirectly using the two items of correlation information alaAH and aliNI contained in the notification staAA.

Following the start of the alarm realignment, the alarms are successively transmitted with the associated alarm data in successive notifications alNO (alarm notification) using the M-EVENT-REPORT service. In this context, the individual notifications alNO each have the item of correlation information aliNI—in the defined notification field "correlated Notifications", for example. After the last M-EVENT-REPORT notification for the alarm realignment, the agent AG generates the M-ACTION response for the notification repAA (report Active Alarms), which contains the item of correlation information alaAH for explicitly identifying the respective request from the manager MA1, MA2. By evaluating this item of correlation information, each manager MA1, MA2 can easily recognize the end of its initiated M-ACTION request and can assign the incoming alarm data to the requests. For the case in which no active alarms are stored at the instant of the M-ACTION request, the agent initiates the M-ACTION response immediately after the notification staAA is sent. The items of correlation information alaAH, aliNI for explicitly assigning a plurality of requests—for possible simultaneous realignments, to a plurality of managers, or for serial realignments, to an individual manager—are nevertheless generated by the elements involved in the agent/manager relationship and are sent in the notifications repAA, staAA. Even if the example described in relation to FIG. 4 relates to parallel realignments for a plurality of managers, the notification flow can, of course, be applied to a plurality of requests triggered in succession by an individual manager, with the advantage that the explicit assignment using the correlation information provides the individual manager with the option of being able to assign the incoming responses from the agent with the alarm data explicitly to the requests—for example from different applications in the manager—even if the sequence is not observed. Requests sent in succession can possibly overtake one another, for example if a packet network is traversed between the agent and the manager.

Figure 5:
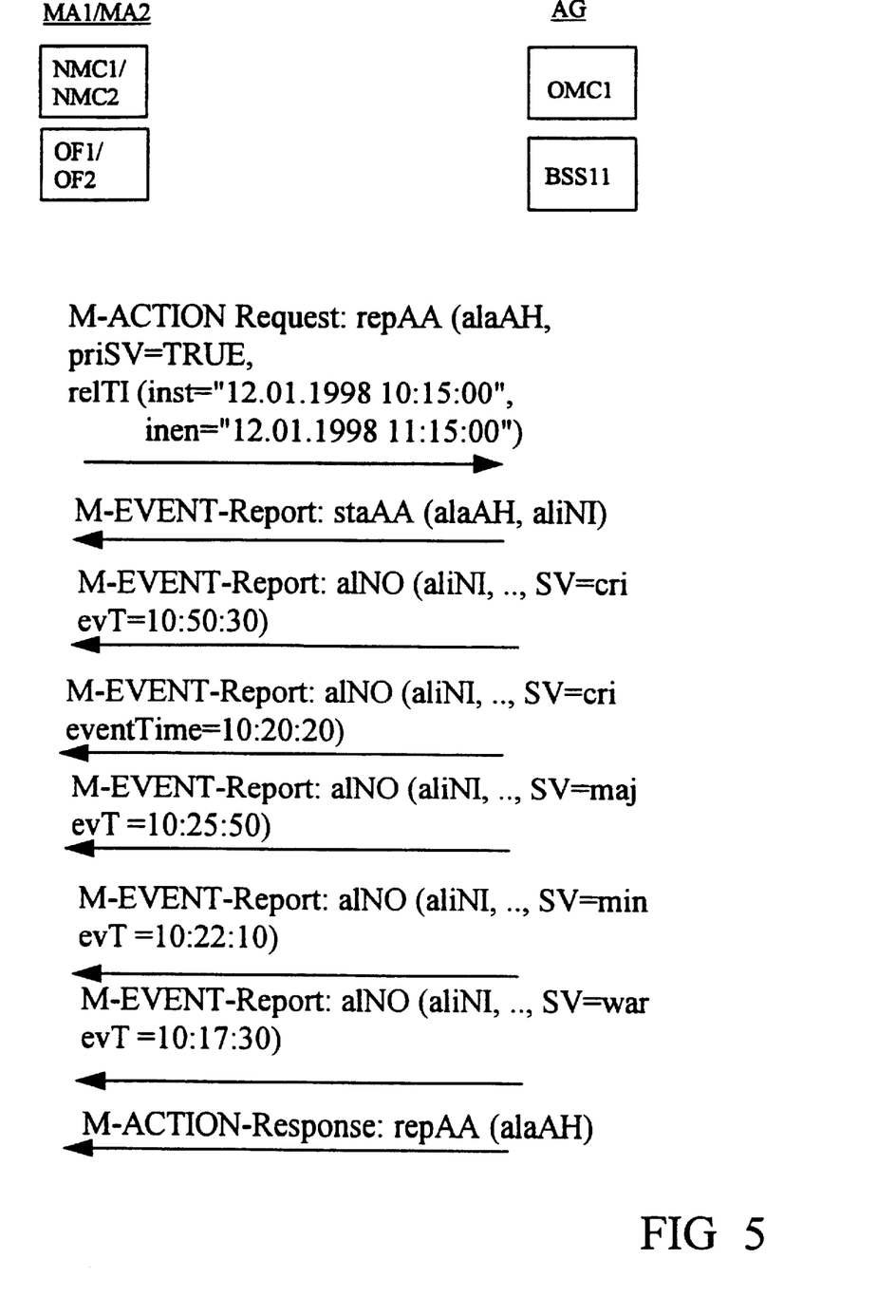
FIG. 5 shows the notification flow in accordance with FIG. 4, based on the example of the use of two different parameter values.

FIG. 5 shows the notification flow shown in FIG. 4 when two different parameter values are used, which in the present example are formed by the parameter values priSV and relTI. The parameter value priSV assumes the value TRUE, which signals to the agent that, for the alarms' sending sequence, it should prioritize according to different urgency values. If the parameter value priSV assumes another value (e.g. FALSE), the agent dispenses with prioritization according to urgency values. If the optionally present field is not used at all by the manager for controlling the requested alarms, all the active alarms having an assumed urgency are transmitted (default mode). The second parameter value relTI contains a sequence of two values inst (Interval Start) and inen (Interval End), which mark a start instant and an end instant for defining a time interval. This means that only those alarms are requested from the agent which originate within the time interval identified by inst, inen. If the optionally present field is not used at all by the manager for controlling the requested alarms, all the active alarms are transmitted without taking into account the origination instant (default mode). In the present example, specifically only the alarms—prioritized according to their urgency (see comments above)—arising between "inst=12.01.98 10:15:00" and "inen=12.01.98 11:15:00" are provided by the agent and sent to the manager.

On the basis of the example in FIG. 5, the alarm data for the selected alarms is sent, using the M-EVENT-REPORT service, in the notifications alNO, which follow the notification staAA. The individual notifications alNO have, in addition to the correlation information aliNI, a value for the urgency SV (perceived Severity) of the alarm and an origination instant evT (event Time) for the alarm. The different urgency values range from "critical" cri through "major" maj, "minor" min up to "noncritical" war (warning). A critical alarm is interpreted as being one in which the set of functions is assumed to be no longer present, whereas, with a noncritical alarm, the set of functions is assumed to be still present. If the manager receives the urgency value war, it interprets this alarm as a warning relating to possible impairment of the agent's functions.

The set parameters relating to the urgency and relating to the time interval to be checked by the agent give the two notifications alNO, sent first, the values SV=cri, for the presence of critical urgency, with associated values evT=10:50:30 and evT=10:20:20 for the instants of their occurrence. The two immediately ensuing notifications alNO contain the values SV=maj, evT=10:25:50, for identifying an alarm having major urgency, and the values SV=min, evT=10:22:10, for identifying an alarm having minor urgency. The notification alNO, sent last in the example, comprises the values SV=war, evT=10:17:30, equivalent to the display of a warning to the manager. The notification sequence is suitable for individually requesting particular alarms by setting the parameters in each request notification repAA.

Figure 6:
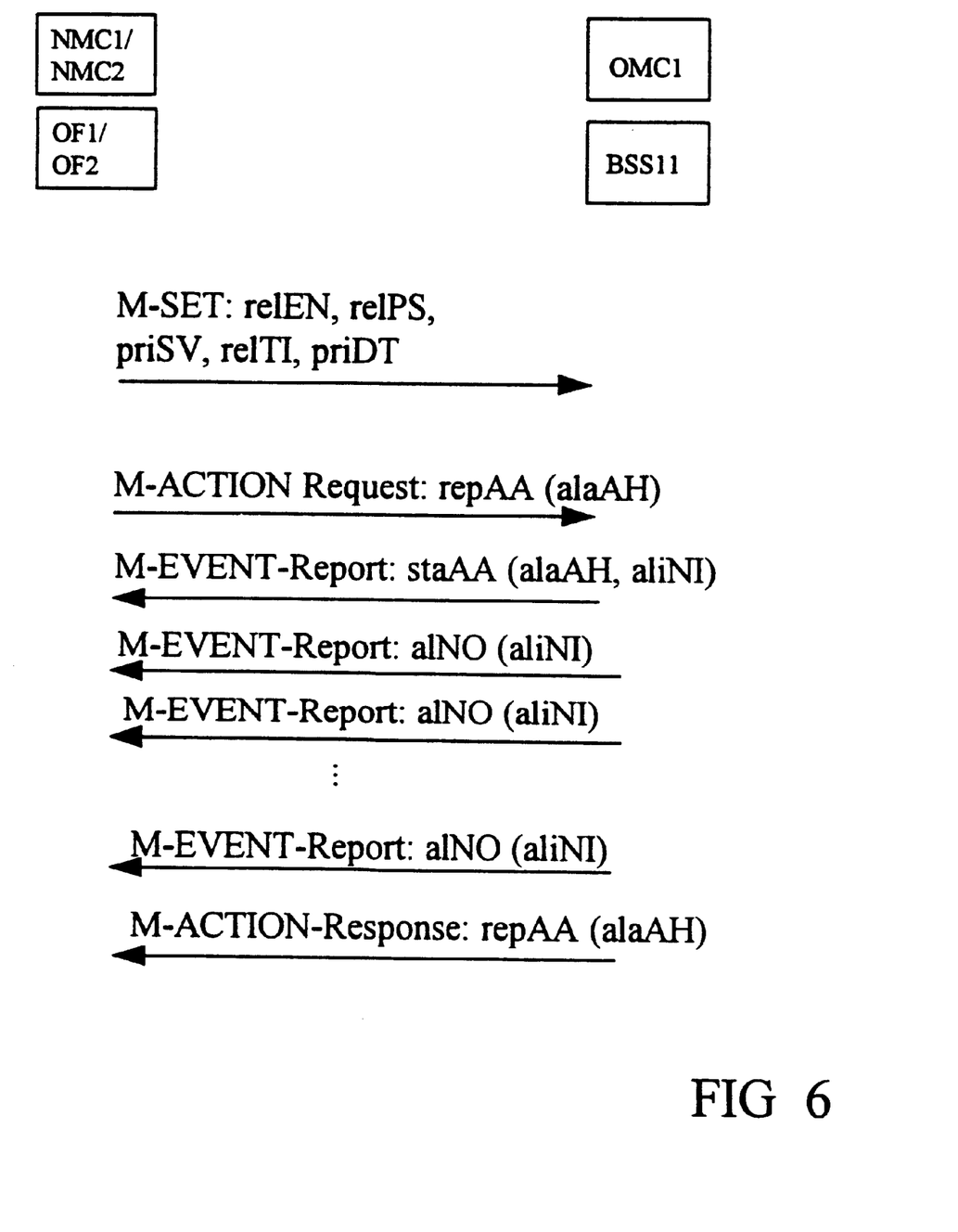
FIG. 6 shows the notification flow between the manager and the agent for the parameter-dependent control of alarm realignment using a one-off setting for a plurality of request notifications.

In contrast to setting for each M-ACTION request, FIG. 6 shows the notification flow between the manager and the agent for parameter-dependent control of alarm realignment using a one-off parameter setting which is valid for a plurality of subsequent request notifications repAA. This advantageously achieves parameterization for the alarm realignment without requiring the parameters to be reset each time. For this purpose, a notification M-SET is given precedence over the request notifications repAA based on M-ACTION request (only one of which is shown by way of illustration), said notification M-SET being used to set the parameter or parameters relEN, relPS, priSV, relTI, priDT, which are inserted by the manager, in the agent as selection criteria for the alarms which are to be transmitted.

Figure 7:
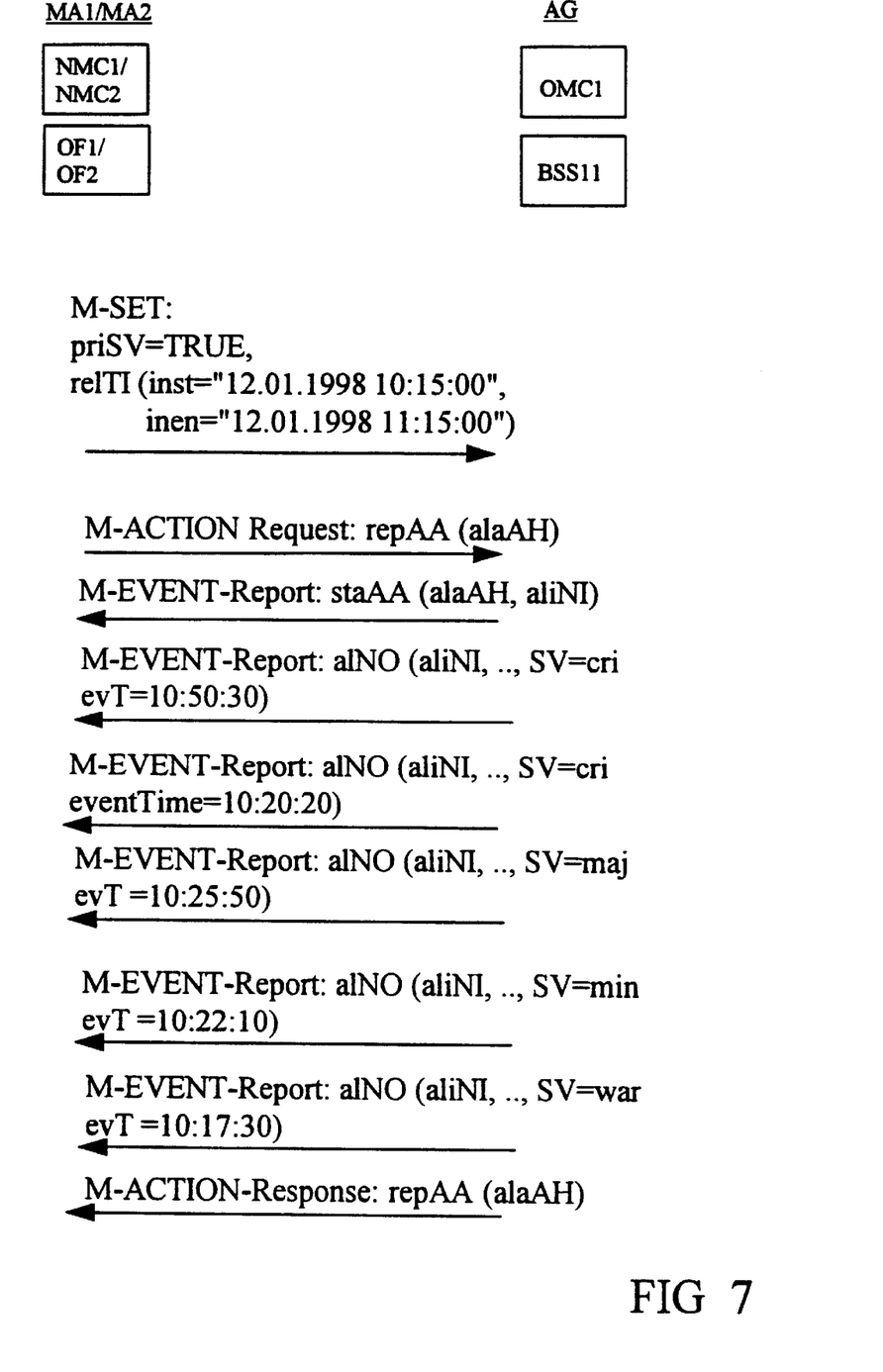
FIG. 7 shows the notification flow in accordance with FIG. 6, based on the example of the use of two different parameter values.

FIG. 7 shows the notification flow associated with the procedure shown in FIG. 6 when the two parameters priSV, relTI already described in relation to FIG. 5 are set. In contrast to FIG. 5, the time interval defined by the start instant inst and the end instant inen, in the form of parameter value relTI—the agent is intended to register alarms and prioritize them according to urgency only in this time window—, and the urgency, in the form of parameter value priSV, are inserted into the setting notification M-SET by the manager and sent to the agent in advance. The settings remain valid for all successive request notifications until a new setting notification M-SET overwrites the previous parameters or declares them to be invalid. The notifications alNO contain the same parameter values specified by way of example in FIG. 5 and described in accordance with the associated comments.

Figure 8:
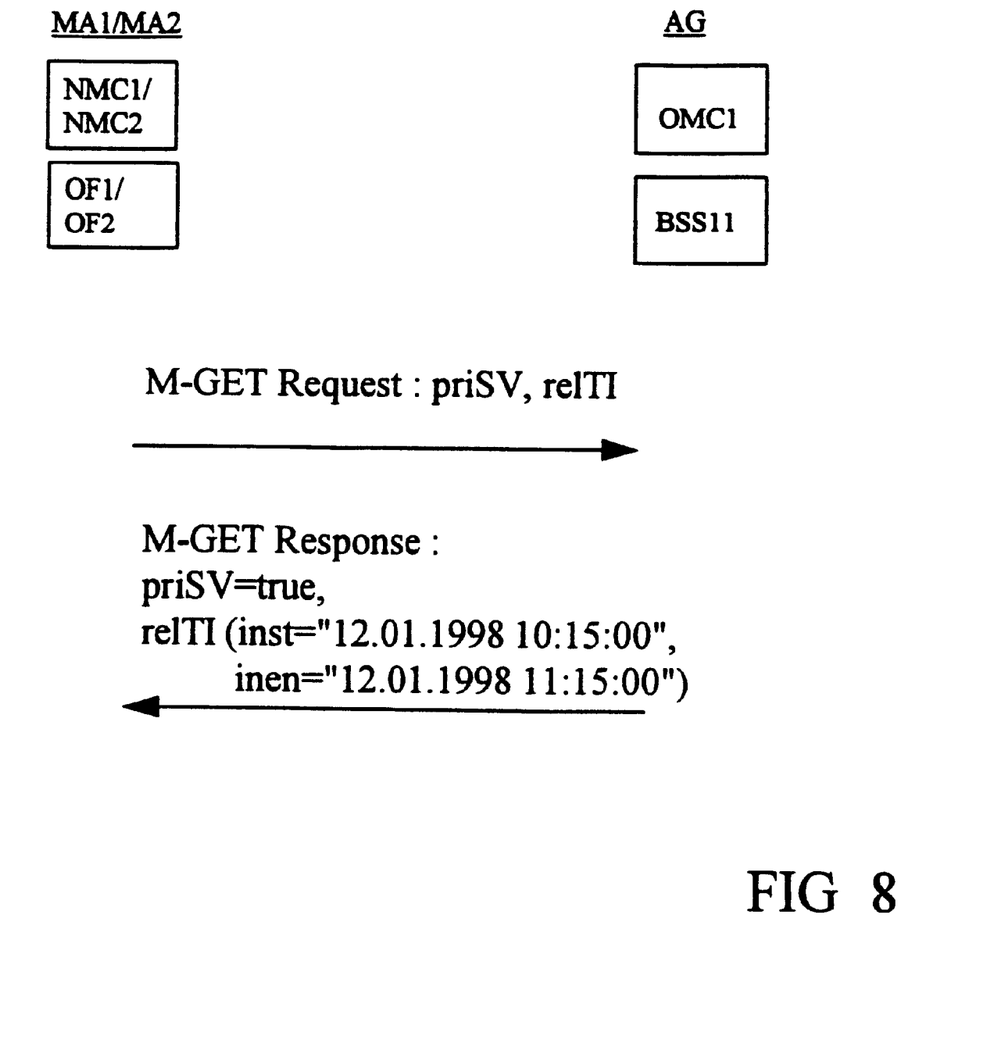
FIG. 8 shows the notification flow between the manager and the agent for polling the parameter values used for the alarm realignment, as shown in FIG. 7.

FIG. 8 shows the notification flow between the manager and the agent for polling the parameter values which are used for the alarm realignment and are set in the agent, as shown in FIG. 7, and which were transmitted to the agent with the setting notification which was sent in advance. For this purpose, the manager generates an M-GET request with the parameter values which are to be polled—in the example the parameter values priSV, relTI—and sends them to the agent. In response, the polling manager receives a notification M-GET response with the agent's currently valid settings for the predetermined parameter values. In the present example, the agent's acknowledgement in the notification M-GET response comprises the values priSV=TRUE and relTI (inst=12.01.98 10:15:00, inen=12.01.98 11:15:00).

This allows the manager to check which current setting is present, in order possibly to make changes when particular alarms are requested later by successively producing and sending request notifications.

What is claimed is:

1. A method for handling alarms in a telecommunication system using a management network which has a plurality of management levels, wherein alarm data for active alarms is transmitted for alarm realignment between an agent on one management level and at least one manager on a next highest management level, the method comprising the steps of:

sending, from the at least one manager to the agent, at least one request notification for transmission of the alarm data;

sending, from the agent to the at least one manager, correlation information for assigning a respective request to the at least one request notification with the alarm data; and controlling, via the at least one manager, the alarm realignment on the basis of at least one parameter sent to the agent by the at least one manager.

2. A method for handling alarms in a telecommunication system using a management network which has a plurality of management levels as claimed in claim 1, wherein the at least one manager sends the at least one parameter to the agent in the at least one request notification.

3. A method for handling alarms in a telecommunication system using a management network which has a plurality of management levels as claimed in claim 1, wherein the at least one manager sends the at least one parameter to the agent in a setting notification which has the precedence over the at least one request notification.

4. A method for handling alarms in a telecommunication system using a management network which has a plurality of management levels as claimed in claim 1, the method further comprising the step of:

providing, via the at least one manager, the at least one parameter with a parameter value which requests from the agent alarms which originate from selected agent units.

5. A method for handling alarms in a telecommunication system using a management network which has a plurality of management levels as claimed in claim 1, the method further comprising the step of:

providing, via the at least one manager, the at least one parameter with a parameter value which requests from the agent alarms for which there is an assumed urgency.

6. A method for handling alarms in a telecommunication system using a management network which has a plurality of management levels as claimed in claim 5, the method further comprising the step of:

providing, via the at least one manager, an additional parameter value which is used by the agent to prioritize the requested alarms according to their respective urgencies.

7. A method for handling alarms in a telecommunication system using a management network which has a plurality of management levels as claimed in claim 6, the method further comprising the step of:

prioritizing, via the agent, the alarms which are to be transmitted to the at least one manager according to different urgency values.

8. A method for handling alarms in a telecommunication system using a management network which has a plurality of management levels as claimed in claim 1, the method further comprising the step of:

providing, via the at least one manager, the at least one parameter with a parameter value which requests from the agent alarms which originate within a time interval which is defined by a start instant and an end instant.

9. A method for handling alarms in a telecommunication system using a management network which has a plurality of management levels as claimed in claim 8, the method further comprising the step of:

providing, via the at least one manager, an additional parameter value which is used by the agent to prioritize the alarms according to an origination instant of the alarms.

10. A method for handling alarms in a telecommunication system using a management network which has a plurality of management levels as claimed in claim 9, the method further comprising the step of:

providing and sending, via the agent, the alarm data for the alarms having the earliest origination instants first; and providing and sending, via the agent, the alarm data for the alarms having the most recent origination instants last.

11. A method for handling alarms in a telecommunication system using a management network which has a plurality of management levels as claimed in claim 9, the method further comprising the step of:

providing and sending, via the agent, the alarm data for alarms having critical urgency first, for which a set of functions is assumed to be no longer present; and providing and sending, via the agent, the alarm data for alarms having non-critical urgency last, for which a set of functions is assumed still be to present.

12. A telecommunication system for handling alarms using a management network which has a plurality of management levels, the alarm data for active alarms being transmitted for alarm realignment between an agent on one management level and at least one manager on a next highest management level, the telecommunication system comprising:

a transmission element in the element in the at least one manager for sending at least one request notification to the agent for transmission of the alarm data;

a receiving element in the at least one manager for receiving correlation information from the agent for assigning a respective request tot he at least one request notification with the alarm data; and a control element in the at least one manager for controlling the alarm realignment on the basis of at least one parameter sent to the agent by the at least one manager.

13. A telecommunication system for handling alarms using a management network which has a plurality of management levels as claimed in claim 12, wherein the control element inserts the at least one parameter into the at least one request notification.

14. A telecommunication system for handling alarms using a management network which has a plurality of management levels as claimed in claim 12, wherein the control element inserts the at least one parameter into a setting notification which has the precedence over the at least one request notification and which is sent to the agent.

15. A telecommunication system for handling alarms using a management network which has a plurality of management levels as claimed in claim 12, wherein the at least one manager provides the at least one parameter with a parameter value which requests from the agent alarms which originate from selected agent units.

16. A telecommunication system for handling alarms using a management network which has a plurality of management levels as claimed in claim 12, wherein the at least one manager provides the at least one parameter with a parameter value which requests from the agent alarms for which there is an assumed urgency.

17. A telecommunication system for handling alarms using a management network which has a plurality of management levels as claimed in claim 16, wherein the at least one manager provides an additional parameter value which is used by the agent to prioritize the requested alarms according to their respective urgencies.

18. A telecommunication system for handling alarms using a management network which has a plurality of management levels as claimed in claim 12, wherein the at least one manager provides the at least one parameter with a parameter value which requests from the agent alarms which originate within a time interval which is defined by a start instant and an end instant.

19. A telecommunication system for handling alarms using a management network which has a plurality of management levels as claimed in claim 18, wherein the at least one manager provides an additional parameter value which is used by the agent to prioritize the alarms according to an origination instant of the alarms.

* * * * *

UNITED STATES PATENT AND TRADEMARK OFFICE
CERTIFICATE OF CORRECTION

| | | |
|---|---|---|
| PATENT NO. | : 6,351,213 B1 | |
| APPLICATION NO. | : 09/600559 | |
| DATED | : February 26, 2002 | |
| INVENTOR(S) | : Lucian Hirsch and Alfred Schmidbauer | |

It is certified that error appears in the above-identified patent and that said Letters Patent is hereby corrected as shown below:

On the title page of the patent, at item (75), after "Lucian Hirsch, Munich (DE)" insert
--; Alfred Schmidbauer, Munich (DE)--

Signed and Sealed this
Fifth Day of February, 2013

Teresa Stanek Rea
*Acting Director of the United States Patent and Trademark Office*